O. F. JORDAN, DEC'D.
S. K. & I. C. JORDAN, EXECUTORS.
RAILROAD SPREADER.
APPLICATION FILED JUNE 7, 1909.
996,256.
Patented June 27, 1911.
4 SHEETS—SHEET 4.
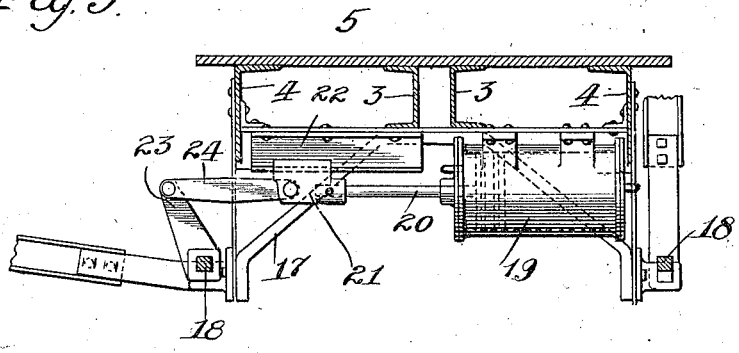
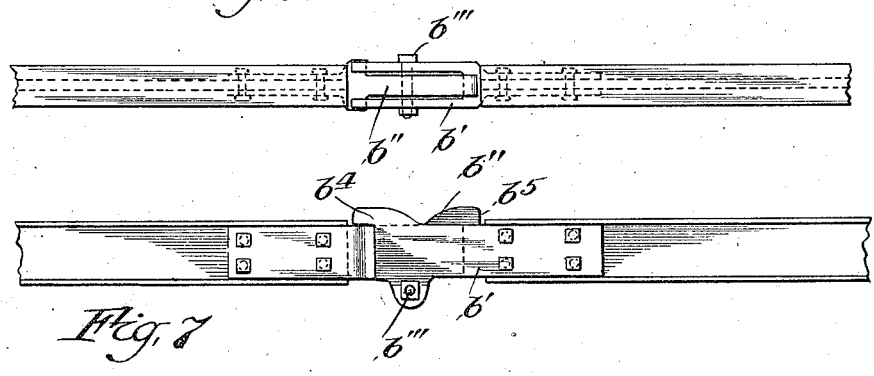
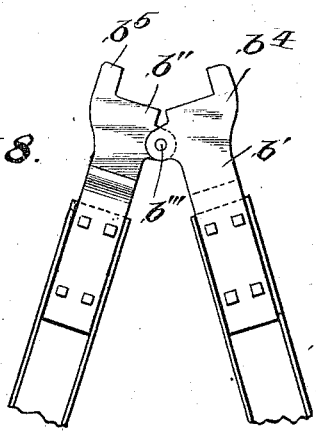
Witnesses:
Inventor:
Oswald F. Jordan

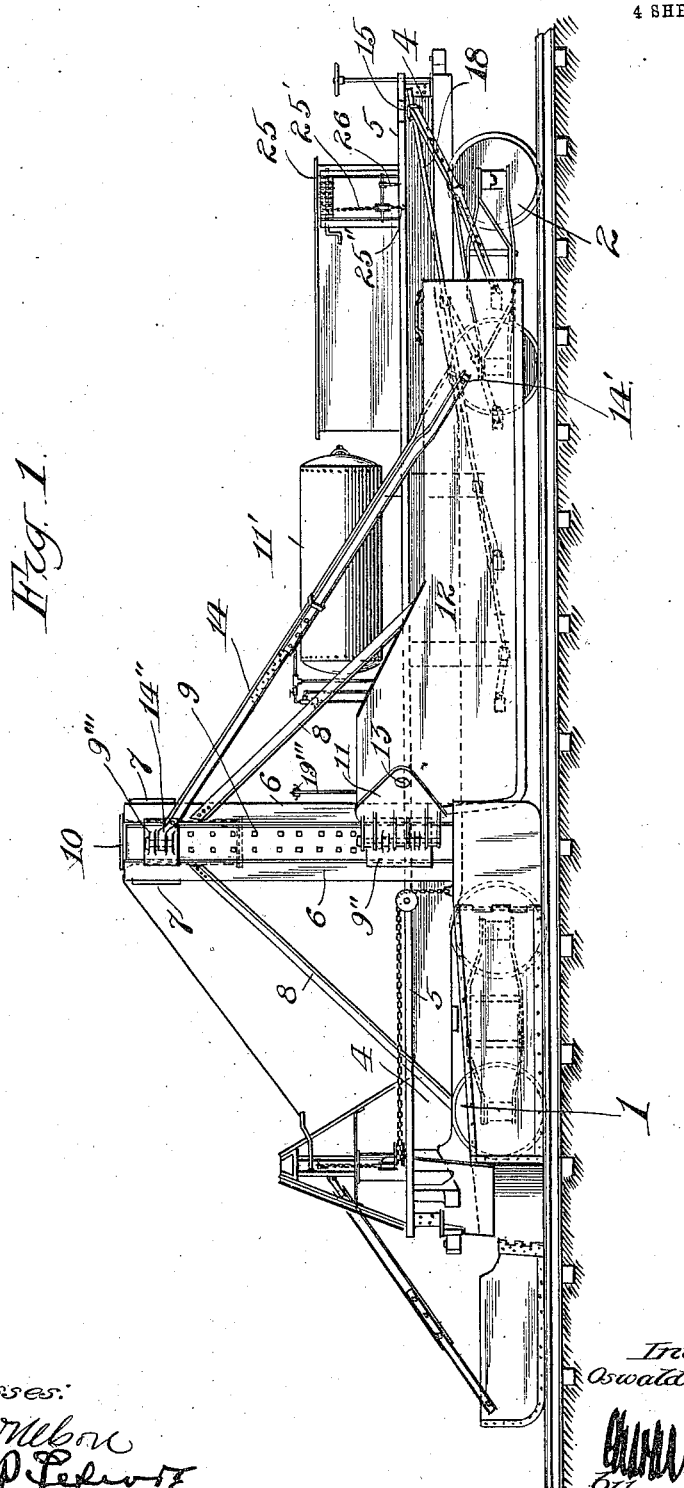

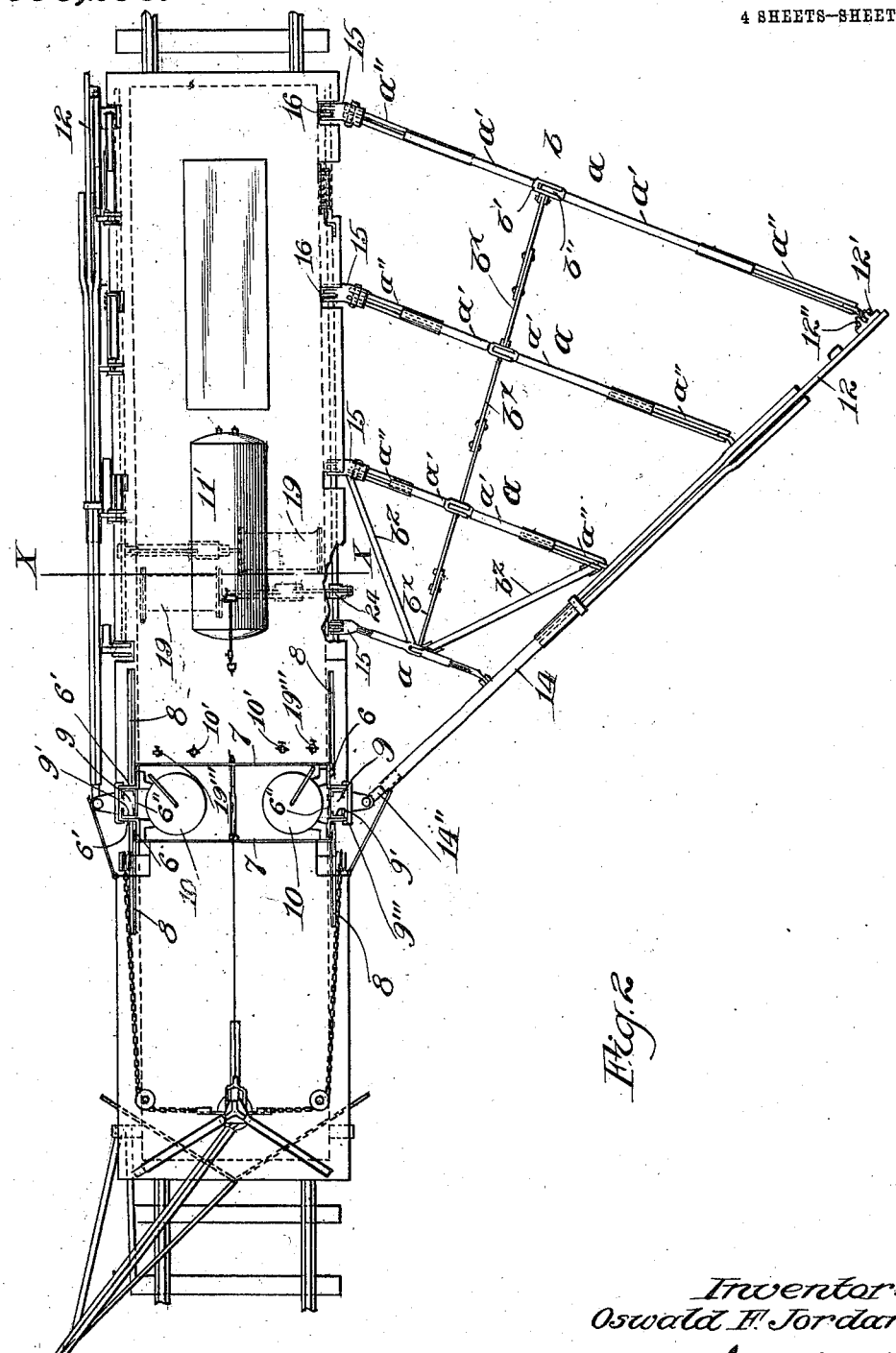

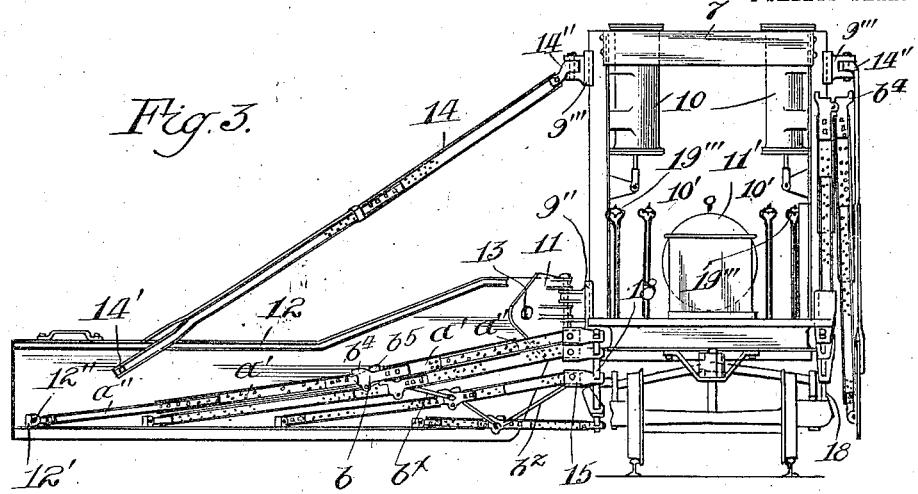
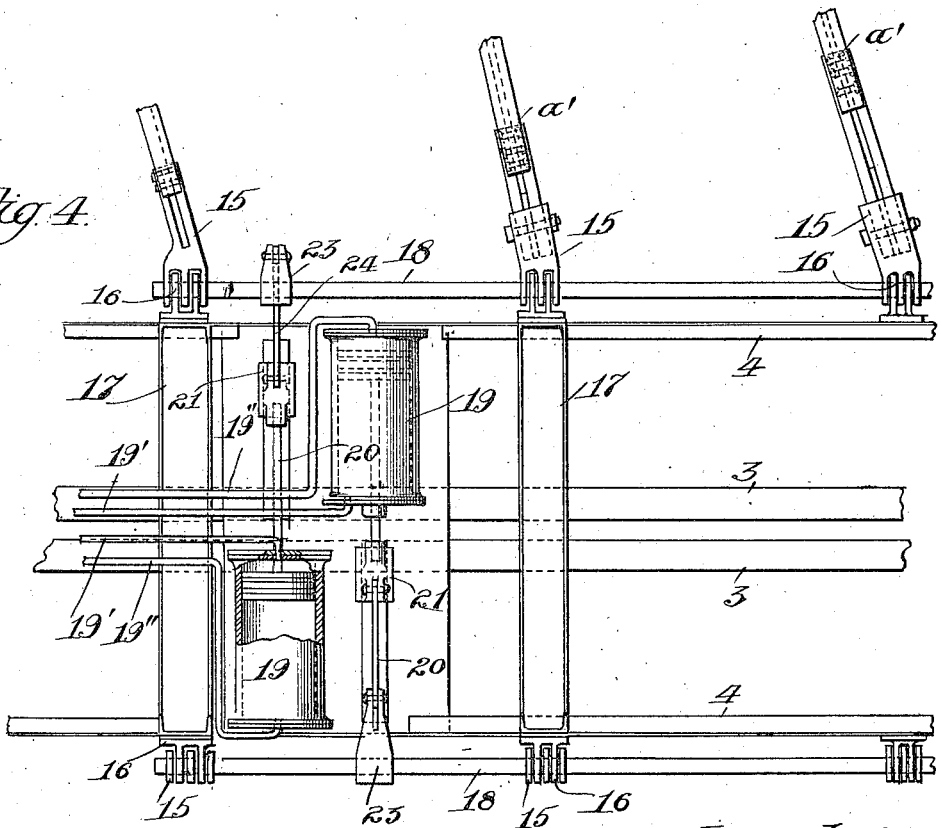

UNITED STATES PATENT OFFICE.

OSWALD F. JORDAN, OF CHICAGO, ILLINOIS; SARAH KING JORDAN AND IRENE C. JORDAN EXECUTORS OF SAID OSWALD F. JORDAN, DECEASED.

RAILROAD-SPREADER.

996,256.  Specification of Letters Patent. Patented June 27, 1911.

Application filed June 7, 1909. Serial No. 500,491.

*To all whom it may concern:*

Be it known that I, OSWALD F. JORDAN, a citizen of the United States, and a resident of Chicago, Cook county, Illinois, have invented a certain new, useful, and Improved Railroad-Spreader, of which the following is a full, clear, and exact description, such as will enable others skilled in the art to which it appertains to make and use the same.

My invention relates to improvements in machines for constructing railroads and has particular reference to improvements in railroad spreaders, a class of machines used for distributing ballasting and other material and for surfacing road beds or ways.

My invention relates further and particularly to improved manually controlled power operated means for operating the spreader wings.

Further my invention relates to a modification of the railroad spreader which is shown and described in United States Letters Patent No. 852,880, granted to me May 7, 1907, the present invention being in the nature of an improvement, whereby the spreader wings can be automatically operated through the medium of the spreader wing braces, which form a series of power devices for distending and retracting the spreader wings.

The object of my invention is to provide a railroad spreader of improved and simplified construction.

A particular object of my invention is to provide a simple, durable and efficient railroad spreader, which shall be practically automatic in all of its operations and which may be controlled and operated by men riding on the machine.

A further and special object of my invention is to improve the construction of the systems of braces belonging to the spreader wings to the end that they may be used as the means of distending and retracting the wings and also serve to rigidly brace the wings when in operative or working position.

Still further objects of my invention will appear hereinafter.

My invention will be more readily understood by reference to the accompanying drawings forming a part of this specification and in which:

Figure 1 is a side elevation of a railroad spreader embodying my invention. Fig. 2 is a plan view thereof; Fig. 3 is a rear elevation of my improved railroad spreader; Fig. 4 is an enlarged bottom plan view, from beneath, showing the engines and connecting parts for distending and retracting the spreader wings; Fig. 5 is an enlarged sectional elevation of one cylinder and coacting parts, substantially on the line X—X of Fig. 2; and Figs. 6, 7, and 8 are enlarged detail views of the hinge portion of the spreader wing braces.

In general appearance my improved railroad spreader resembles an ordinary flat car; it is however, usually of less width than a flat car, as it is desirable that the spreader wings shall work close to the rails of the track. As herein shown, the car is provided with front and rear trucks, 1 and 2; the body of the car comprising an under-frame composed of suitably connected center and side sills 3 and 4. A floor, 5, is laid on the under frame, extending from end to end thereof. At a point just back of the front truck I erect the columns, 6, 6. These columns are secured to opposite sides of the under frame and extend nearly to the rails. They are cross connected by braces, 7, 7, and are stiffened fore and aft by the inclined braces, 8, 8.

The column structure is practically the only superstructure on the underframe. It will be noted that I have dispensed with the extensive superstructure illustrated in my Patent No. 852,880. By avoiding the extensive superstructure, I considerably simplify the machine, and also make it easier for men to work upon it. I accomplish this desirable simplification by operating the side wings from points beneath the underframe, thereby avoiding the overhead lifting and winding mechanism required in the special machine that is illustrated in my previous patent. The details of the operating mechanism will appear hereinafter. The columns serve to hold the large heavy spreader wings, and as these hang far out from the sides of the car the connections between the wings and the columns are formed by the vertically movable wing hinge posts, 9, 9. On referring to Fig. 2, it will be seen that each column is made up of two angle irons 6', 6', and a back plate or cross strap, 6''. The post, 9, is held between the parallel column forming angles and slides freely within the column, which latter obviously serves as a guide for the post. For sake of strength and durability, I preferably form the posts, 9, of wood and face the sides thereof with plates, 9'. I prefer to operate the post, 9, by means of compressed air engines, 10, 10, respectively. The car being equipped with a compressed air reservoir suitably connected to the cylinder of the engines, 10, 10. 10', 10' represent the throttle and regulating valves of the engines.

I employ positive manually operated or adjusted means for fastening the hinge posts in their raised or lowered positions at times when it is not desirable to maintain pressure in the engines 10. These being incidental, and having appeared in one form in Patent No. 852,880, I have deemed it unnecessary to illustrate them in detail herein.

The two sides of the car are exactly alike except that the parts occupy reverse positions; this being the case a description of one of the spreader wings and its operating mechanism will serve to clearly define both wings. It should be here remarked that the wings are independently operated, and either one thereof or both of them may be used at one time, according to the work to be done. As shown in Fig. 1, the post 9, bears a heavy hinge plate, 9", on its lower outer part and to this is secured the heavy hinge section, 11, of the large spreader wing, 12. The pivot pin of the hinge occupies a vertical position, and the wing, 12, is pivoted in the part, 11, by means of the horizontal pin, 13. The two pivot pins being thus at right angles allow the wing, 12, to swing in both horizontal and vertical directions. The horizontal movement occurs in the distending and retracting the wing to and from its working position (see Fig. 2), and the vertical movement of the wing occurs when it is desired to incline the same with relation to a horizontal plane, such positions of the wing being required in the formation of convex and concave roadways. The free end of the wing, 12, is sustained and also braced by the adjustable, telescopic brace, 14, the lower end of which is pivotally attached to the wing at 14', while its upper end, 14", is vertically pivoted to a plate, 9''', on the upper end of the post, 9. Attention is called to the fact that both of the plates, 9" and 9''', are provided with flanges which engage the sides of the column and assist in guiding the post therein. As the wing is attached to the post at the hinge and also by the brace, 14; it is obvious that it will rise and fall with the post, 9, under operation of the engine, 10, and that if need be the latter may be employed to positively hold the wing down to its work. Both Figs. 1 and 3 show one of the spreader wings distended, but neither shows the wing lowered to its usual working position. When at work its lower edge is usually somewhat below the level of the track.

For holding the wing distended against the ballast which it must displace as the car is moved forward, I employ a plurality of braces $a$, $a$, $a$, $a$, which extend from the side of the car to the inner side of the wing. I prefer that the brace attachments shall be close to the bottom of the wing, as shown in Fig. 3, as that part of the wing is under the greatest stress when the machine is at work. Instead of making the braces in the form of rigid struts or beams having their outer ends detachably joined to the wing, (see Patent No. 852,880) I form the braces after the manner of toggle levers and permanently connect their ends to the wing and to the car. From this it will be seen that it is now no longer necessary to loosen, detach and elevate the braces or struts when it is desired to retract the wing; and this present machine is a great improvement over the old machines, being much easier and quicker to operate. The width of the track of the machine, $i.$ $e.$ the working scope of the wing, is governed by adjusting the lengths of the braces, it will be noted that each link is composed of telescopically connected or jointed sections, thus each brace ($a$) is composed of two parts which are pivotally connected at, $b$, and each part is composed of two sections, $a'$ and $a''$, which are slidably connected. A large number of holes is provided in the sections, and when once they have been adjusted, the parts are fastened by bolts (not shown) which pass through these holes. The length of the braces is rarely changed after they are once adjusted, changes being necessary only when the width of the road bed or embankment is materially altered. The wing is provided with pivot blocks, 12', for the several braces, and the outer end of each brace is equipped with a complementary casting secured to the respective block, 12', by a horizontal pivot pin, 12". The inner end of each brace is equipped with an angular socket casting, 15, wherein the section, $a''$, is rigidly secured. The ends of the castings, 15, are preferably bifurcated and interlocked with similarly formed bearing blocks, 16, as shown in Figs. 2 and 4. These bearing blocks are fastened upon brackets, 17, which depend from the side of the underframe. They contain round holes, whereas, the castings, 15, contain square holes. Through all the bearing blocks, 16, and the brace members, 15, I extend a square rocking shaft, 18, which snugly fits the square holes in the members, 15. This shaft may, obviously rotate freely in the bearings, 16, and when rotated rocks the members, 15, and the brace sections that are rigidly attached thereto, thus the inner parts of the several braces become, in effect, arms which extend from the rocking shaft, 18. I utilize these power arms as the means of opening and closing the toggle levers of which they form parts, and thereby swing the wing in or out at will. As best shown in Figs. 1 and 3, I prefer to arrange the bearings, 16, and the rocking shaft, 18, in an angular or inclined position on the side of the car, such position being best suited to the easy operation of the generally triangular structure constituted by the car, the wing and the braces. Excessive distortion of, and strains upon the brace members are avoided by positioning the rocking shaft in this manner. The joints, b, of the braces are so formed that when the braces are distended the middle pivot points fall below the pivots at the ends of the braces, the braces thus lock themselves in open or distended condition and cannot be collapsed or kneed by pressure on the wings.

The joints, b, are shown in detail in Figs. 6, 7 and 8. Each joint is composed of two members, b' and b'', pivoted by a cross bolt or pin, b''', in their lower parts. These members are provided with stop lugs, b⁴ and b⁵, respectively, which prevent the braces from sagging too far below their straight line. In practice I so form the parts that the two sections of each brace are in alinement when straightened out, such disposition being best suited to resist end thrust. The greater the pressure on the wing the more rigid the braces become. The several members, b', are connected by the stays, bˣ, which are also adjustable in length, and I preferably connect the first two, i. e., the shorter braces by cross braces, bᶻ. These braces being rigidly connected in their outer and inner sections, make the brace structure rigid throughout. It will be noted that the inner and outer parts of the braces are not of the same length. This difference is brought about by the elevation of the inner ends of the three long braces and the relative depression of the short brace, due to the angular position of the rocking shaft, 18. By thus proportioning the sections or parts of the braces I adapt them to collapse into compact upright positions, as shown at the right-hand side of Fig. 2.

It will now be evident that the system of braces performs the double function of a bracing system and of operating mechanism, and as I have direct control of the wing through the medium of the rocking shaft I am able after raising the wing to almost instantly swing the wing to avoid heavy obstacles which may be encountered in its path. It is entirely feasible to operate a rocking shaft manually, but for better control and much quicker operation it is possible through the use of a fluid pressure engine, and as indicated in the drawings, I prefer to employ one such engine for each wing, 12. These engines clearly appear in Figs. 2, 4, and 5, and comprise horizontally operable pistons with coöperating parts connecting them to respective square shafts, 18. Each engine is composed of a cylinder, 19, fixed to the underframe on the side opposite the shaft to be operated. The piston rod, 20, joins a cross-head, 21, shaped to slide upon the flange of an eye beam, 22, which is transversely secured on the underframe and serves as the crosshead guide. A rocker arm, 23, fastened on the square shaft, 18, is connected with the crosshead by a connecting rod, 24. Suitables pipes, 19', 19'', communicate with the ends of the cylinder and lead to a controlling valve, 19''', through which the actuating fluid (usually compressed air) is received and exhausted, the tank, 11, being the source of pressure. When the piston is forced outwardly the rocking shaft, 18, is positively operated to distend the braces and the wing, 12; opposite movement of the piston causes the braces and the wing to collapse or fold against the side of the car, as illustrated in Fig. 3. In practice I arrange the valves, 10', and 19''', close together so that they may be attended to by one man, who, by working the engines, 10 and 19, may raise or lower, distend or collapse the heavy wing, as required to meet the varying conditions of road building.

It is desirable to secure the wings firmly against the sides of the car when the same is being moved from place to place, and as most conveniently adapted to this work I employ the small windlasses, 25, on the rear end of the car. When a wing is raised to its full height and is swung against the side of the car it is within reach of the windlass chain, 25', and the hook, 25'', thereof being attached to the end of the wing, the latter may be pulled close up to the side, in which position I fasten it by means of a hook, or dog, 26, on the windlass frame. Once locked in this manner the wing can only be released by lifting off the hook. The best time to adjust the length of the braces is when they are in vertical or folded condition, as they are then readily accessible from the floor of the car.

I have illustrated in these drawings a front end plow of peculiar construction and particularly designed to operate with spreader wings of the kind hereinbefore described. The plow, however, forms subject matter of a companion application of even date herewith, and therefore need not be here described in detail. I do not limit my present invention to use with this front end plow or in fact to the specific construction of the car or spreader wings herein shown, it being obvious that various modifications thereof will readily suggest themselves to those who are skilled in the art.

Having thus described my invention, I claim as new and desire to secure by Letters Patent:

1. The improvement herein described, comprising a car, in combination with a spreader wing having its forward end pivoted thereto, a plurality of wing swinging and holding braces joining the wing and car and means for actuating said braces to swing the wing, substantially as described.

2. The improvement herein described, comprising a car, in combination with a spreader or side plow wing having its forward end pivotally attached to the car, a plurality of toggle braces of varying lengths joining the car and the wing and means for folding and opening said braces to retract and distend the wing, substantially as described.

3. The improvement herein described comprising a car in combination with a spreader or side plow wing having its forward end pivotally attached to the car, a plurality of toggle braces of varying lengths joining the car and the wing, the middle pivots of said braces being formed to pass centers with the end pivots thereof, stop means co-acting with said middle pivots and limiting the opening movement of respective braces, and means for actuating said braces to distend and retract the wing, substantially as described.

4. The improvement herein described, comprising a car in combination with a spreader or side plow wing having its forward end pivoted on the car and having its free end also supported therefrom, mechanism for raising and lowering said wing upon the car, a toggle lever brace extending between the wing and the car and mechanism on the car for folding and opening said brace to swing the said wing, substantially as described.

5. The improvement herein described, comprising a car, in combination with a spreader wing pivoted upon and vertically movable upon said car, a plurality of toggle lever braces pivotally connected with the car and wing, said braces being substantially parallel one to the other, means connecting the pivot joints of said braces, cross braces affording rigidity to the system of braces, and mechanism on the car for positively actuating the toggle lever braces to swing said wing, substantially as described.

6. The improvement herein described, comprising a car, in combination with a spreader wing having its forward end pivotally supported and vertically movable upon the car, suitable means supporting the free end of said wing, a plurality of braces for holding the wing in distended position, a brace operating mechanism on the car, a windlass on the car for working engagement with the rear end of the wing to position it at the side of the car, and means for there securing the rear end of the wing in position, substantially as described.

7. The improvement herein described, comprising a car in combination with a spreader wing pivotally attached to the side of the car, a stay brace connecting the free end of the wing to the side of the car, means on the car for raising and lowering said wing, a plurality of substantially parallel toggle lever braces of different lengths arranged between the car and the wing, a rocking shaft on the car for simultaneously actuating said braces, said shaft occupying an inclined position on the car, suitable stays joining the braces to one another in series, and means on the car for actuating said rocking shaft, substantially as described.

8. A car in combination with a spreader wing pivotally attached to and vertically movable at the side of said car, and a plurality of wing swinging and holding braces arranged between the wing and the car, substantially as described.

9. The improvement herein described, comprising a car in combination with a pivoted spreader wing, a plurality of wing swinging and holding braces interposed between the wing and the car, and an engine on the car adapted to simultaneously actuate said braces, substantially as described.

10. The improvement herein described, comprising a car in combination with a wing pivoted to swing substantially horizontally toward and from the side of the car, and a plurality of wing braces arranged for operating said wing, said braces being connected for simultaneous operation, substantially as described.

11. The improvement herein described, comprising a car, in combination with a wing pivoted thereto, means for raising and lowering said wing, and a system of movable wing swinging and holding braces arranged between the car and the wing, substantially as described.

12. The improvement herein described, comprising a car, in combination with a wing pivoted thereon, means for raising and lowering said wing, wing swinging and holding braces connected for simultaneous operation, and a brace operating engine on the car, substantially as described.

13. The improvement herein described, comprising a car, in combination with a spreader wing pivoted on the side thereof, an engine for operating said wing vertically, a plurality of suitably braced wing actuating braces, a brace actuating engine on the car, and engine controlling valves upon the car adapted for one man control, substantially as described.

14. The improvement herein described comprising a car, in combination with a spreader wing pivotally attached to the side of the car, a stay brace connecting the free end of the wing to the side of the car, means on the car for raising and lowering said wing, a plurality of substantially parallel toggle lever braces of different lengths pivotally arranged between the car and the wing, a rocking shaft on the car connected with said toggle lever braces for simultaneously actuating the same to swing said wing and an engine on the car for rocking said shaft, substantially as described.

15. The improvement herein described, comprising a car, in combination with a spreader wing pivotally attached to the side of the car and a wing swinging and holding brace pivotally connecting the car and the wing and movable from an extended position to a retracted position substantially parallel with the side of the car to retract the wing, substantially as described.

16. The improvement herein described, comprising a car in combination with a pivoted spreader wing adapted to fold against the side of the car and a folding, wing actuating, brace pivoted to said wing and operable to distend and retract the same, substantially as described.

17. The improvement herein described, comprising a car in combination with a wing pivoted to swing substantially horizontally toward and from the side of the car and a collapsible brace arranged for operating said wing, substantially as described.

18. The improvement herein described, comprising a car, in combination with a pivoted spreader wing adapted to fold against the side of the car, wing braces pivotally connected to said wing and movable from an extended position to a folded position, simultaneously with the folding of the wing, substantially as described.

19. The improvement herein described, comprising a car, in combination with a pivoted spreader wing adapted to fold against the side of the car, collapsible wing braces pivotally connecting the free end of the wing with the car and movable from an extended rigid position to a collapsed position simultaneously with the folding of the wing, substantially as described.

In testimony whereof, I have hereunto set my hand, this 28th day of May, 1909, in the presence of two subscribing witnesses.

OSWALD F. JORDAN.

Witnesses:
ARTHUR W. NELSON,
JOHN R. LEFEVRE.